United States Patent [19]

Knapp

[11] Patent Number: 4,975,926
[45] Date of Patent: Dec. 4, 1990

[54] WIRELESS INDOOR DATA COMMUNICATION SYSTEM

[76] Inventor: Guenther Knapp, 7 Briarwood Ave., Peabody, Mass. 01960

[21] Appl. No.: 331,279

[22] Filed: Mar. 30, 1989

[51] Int. Cl.$^5$ .......................... H04K 1/00; H04B 9/00
[52] U.S. Cl. ........................................ 375/1; 455/611
[58] Field of Search ................... 375/1; 455/607, 608, 455/611, 617, 618

[56] References Cited

U.S. PATENT DOCUMENTS

| | | | |
|---|---|---|---|
| 4,553,101 | 1/1985 | Mathis | 375/1 |
| 4,703,474 | 10/1987 | Foschini et al. | 375/1 |
| 4,724,435 | 2/1988 | Moses et al. | 375/1 |
| 4,835,517 | 5/1989 | van der Gracht et al. | 375/1 |
| 4,862,478 | 8/1989 | McIntosch | 375/1 |
| 4,864,588 | 9/1989 | Simpson et al. | 375/1 |
| 4,864,589 | 9/1989 | Endo | 375/1 |
| 4,866,732 | 9/1989 | Carey et al. | 375/1 |
| 4,872,182 | 10/1989 | McRae et al. | 375/1 |

OTHER PUBLICATIONS

Disclosure Document #173,032, (7/6/87), Knapp, pp. 1–49.
Fritz R. Gfeller and Urs Bapst, Wireless In-House Data Communication via Diffuse Infrared Radiation, Proceedings of the IEEE, vol. 67, No. 1, Nov. 1979, pp. 1474–1486.
T. S. Chu and M. J. Gans, High Speed Infrared Local Wireless Communication, IEEE Communications Magazine, vol. 25, No. 8, Aug. 1987, pp. 4–9.

*Primary Examiner*—Salvatore Cangialosi

[57] ABSTRACT

Described is an intraoffice communication system as the final communication link of a broadband, baseband, or fiber optic LAN. Each user or workstation is a node on the network and can transmit at high data rates with bit error rates of $\leq 10^{-9}$ in packets through the LAN. Message relaying transponders are placed on the ceiling and walls communicating by electromagnetic waves to individual workstations by broadcast. A novel multipath rejection scheme is combining transponder placements with pseudonoise coding for robust and secure data transmission. For the present state of the art if infrared is used, we estimate a minimum light collecting aperture (receive antenna) of 1 cm$^2$ for transmission rates of 30 to 100 Mb/s.

29 Claims, 16 Drawing Sheets

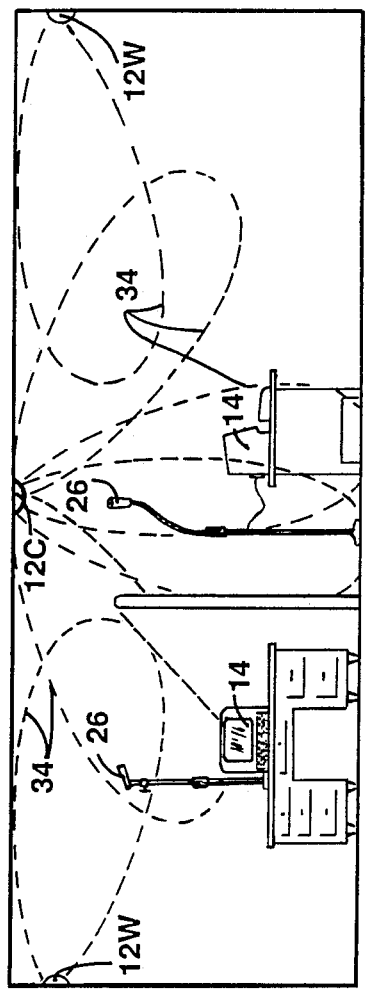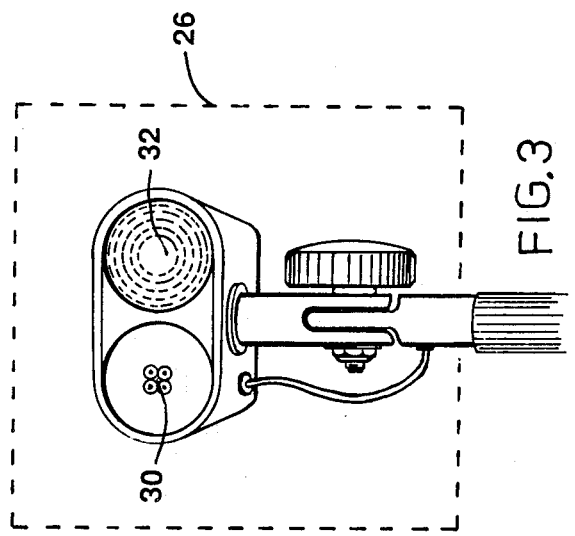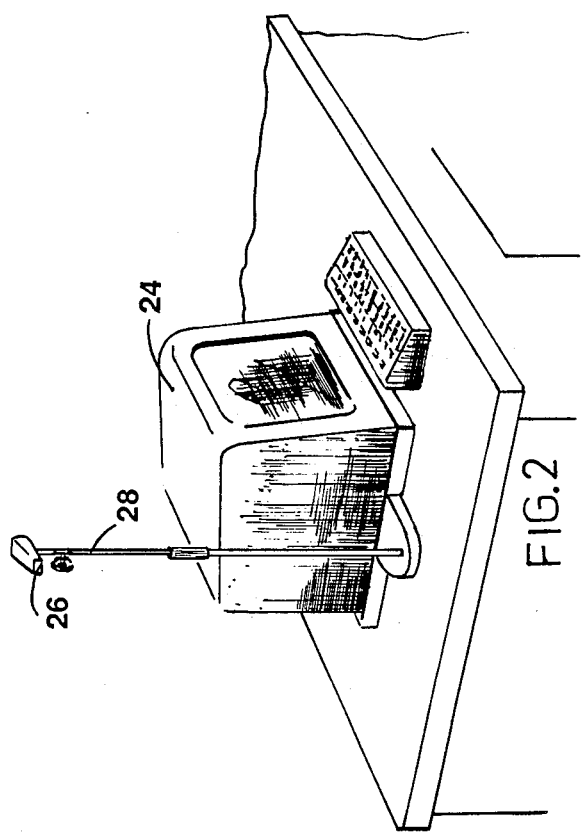

WIRELESS INDOOR DATA COMMUNICATION SYSTEM

FIELD OF THE INVENTION

This invention is related to wireless interconnection of workstations or other devices by means of direct infrared or other electromagnetic radiation.

BACKGROUND OF THE INVENTION

Hard-wired local area networks (LANs) are well established as cable communication links between workstations, computers, and other equipment. The wires and cables interconnecting these devices become cumbersome when a large number of devices need to be connected. For example, in an office with a large number of terminals or workstations, space and/or ducting must be provided for the cabling. Adding or moving a workstation frequently requires cabling to be added or moved. Additionally, the cabling may produce electromagnetic interference (EMI) and is susceptible to picking up EMI which may result in data errors.

In applications were the data is highly confidential, provisions must be made for confinement of the electric fields from the cable to prevent unauthorized interception of communication.

Radio frequency systems have been proposed as a means reducing or eliminating the interconnection cables. This solution requires the dedication of a portion of the radio frequency spectrum to the data communication channel. As the number of users increases and as the desired data transmission rate increases, the bandwidth of this channel must also increase. Different networks using the same frequency band must be geographically separated in order to avoid interference between the networks. One network that has been proposed would use a frequency bandwidth of 10 MHz in the 1700-1710 MHz frequency range. The proposed system could support up to 100 stations. The system is limited, however, to a single network within a 1000 foot radius zone.

Another solution which has been proposed is the use of diffuse infrared radiation. In this system, optical radiation from a transmitter is diffusely scattered from the surrounding walls, ceilings and other objects in the room effectively filling the entire room with the signal carrier. Receivers are non-directional and receive the incoming radiation over a wide field of view. The maximum data rate of such a system is limited by the dimensions of the room in which the system is operating because of the significant propagation times of reflected signals.

Another optical system which has been proposed uses transmitting and receiving optics which have a very small field of view on the order of one degree. These systems provide point-to-point communication and are capable of higher data rates than diffuse transmitting optical systems. These systems, however, require accurate alignment of the transmitting and receiving optics. Additionally, the construction of small angle receivers and transmitters poses problems.

SUMMARY OF THE INVENTION

The present invention includes an interconnection system for connecting multiple terminals or workstations to a LAN. The system uses diffuse infrared propagation with transmitters and receivers which have wide-angle fields of view. The system includes one or more transponders which communicate with remotely located workstations. These transponders use relatively low power optical emitters. Multiple transponders may be used in a single room to provide coverage of the entire area. The optical carrier is modulated with a spread-spectrum pseudonoise signal which provides several advantages. The spread-spectrum signal reduces or eliminates interference from noise sources with spectral spikes, such as fluorescent lights, which may fall within optical range of the receivers. The pseudonoise coding provides further attenuation of interference and allows multiple channels to be used by implementing multiple codes, such as Gold codes, which do not interfere.

Additionally, the present invention prevents interference from reflections or multiple transmissions by providing a delay between signals going to individual transponders that ensures that interfering signals received by a remote station are sufficiently offset in the pseudonoise modulation sequence so that the interfering signals are rejected while the desired signal is received. Alternately, unwanted signals received by transponders from a broad beam transmission of a workstation will be rejected while the desired signal from the closest transponder is accepted by the LAN.

DETAILED DESCRIPTION OF THE DRAWINGS

The advantages and operation of the present invention will be explained by way of example in the following description of the preferred embodiment in conjunction with the drawings referred to therein, of which:

FIG. 2 shows the physical configuration of a remote workstation of the present invention;

FIG. 3 shows the transmitting and receiving optics of a remote workstation;

FIG. 4 illustrates the placement of remote workstations and transponders in a room;

DETAILED DESCRIPTION OF THE PREFERRED EMBODIMENT

The present invention may be used in conjunction with a local area network (LAN) for providing digital communication between workstations, data controlled equipment and/or a central computer. The LAN which may be of conventional type, is used to connect one or more transponders located in a room or other areas. The transponders communicate with individual workstations by means of a free-space infrared (IR) data channel described in detail below. The described embodiment uses a carrier sense multiple access (CSMA) protocol with collision avoidance. The invention is not limited to any particular protocol, however, it may be used with systems utilizing time multiplexing, polling, token passing, or other systems.

The CSMA protocol is especially well suited for use with the present invention because of its high potential data rate, the fact that a remote terminal may attempt to access the network at any time, and the ability of such a network to add and drop terminals without affecting the operation of the rest of the network. Under CSMA with collision detection, workstations sense when the channel is free or busy and transmit information when the free state is detected. If two workstations transmit simultaneously, the collision detection system requests repetition of the transmission. Interface hardware and protocol for use with CSMA LANs are widely available and may be used with the present invention.

Figure 1:
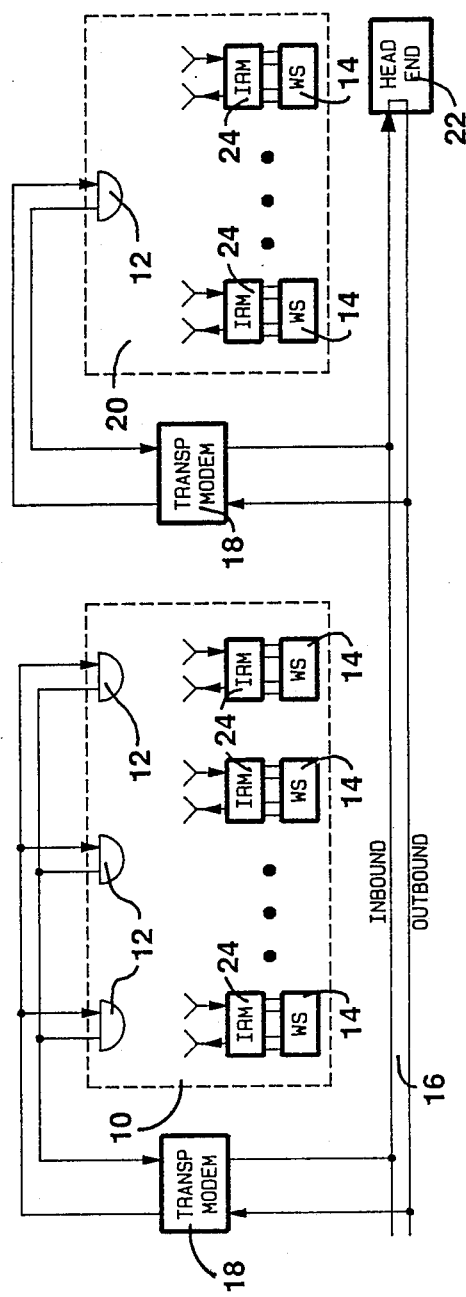
FIG. 1 is a block diagram showing how the present invention is connected to a typical LAN.

Referring to FIG. 1, there is shown an exemplary system which includes workstations in two rooms. A first room 10 includes a plurality of transponders 12 which communicate over a free-space IR data channel with a plurality of workstations 14. The transponders 12 are connected to the LAN data channel by a transponder modem 18 in FIG. 1. The system may include a single transponder modem 18 for a plurality of transponders 12, or alternatively may include individual modems for each transponder. Depending upon the size of the area to be covered, multiple transponders may be required, as shown in room 10 in FIG. 1, or in smaller areas a single transponder 12 may be sufficient to provide the necessary coverage, as shown in room 20 in FIG. 1.

The system may be used with most conventional types of LANs including both baseband and broadband networks and may use both wire and fiber optic cables. Each workstation is connected to an IR station modem (IRM) 24. The LAN 16 may use different protocols, including carrier sensed multiple access (CSMA), polling, token passing, or others, as discussed above.

FIG. 2 shows the physical configuration of a typical work station. In FIG. 2, a terminal or computer 24 is connected to an infrared transmitter/receiver (T/R) head 26 by means of the IRM, not shown in FIG. 2. The T/R head 26 contains one or more transmitter LEDs and receiver optics with a photodiode detector. The T/R head 26 typically transmits and receives over a conical angle in the range of 12 degrees to 45 degrees.

FIG. 3 shows more detail of the configuration of the T/R head 26. In FIG. 3, one or more transmitter LEDs 30 are provided which transmit IR radiation modulated with the data to be sent. The transmitting diodes 30 typically occupy an area on the order of 1 square centimeter. The receiver optics include a lens system 32 to provide optical gain in front of a photodiode. The lens has a diameter of about 1 to 2 inches. Higher gains can be achieved by image intensifiers, multichannel amplifiers, photomultiplier tubes or other detectors. The T/R head 26 is relatively small and may be mounted on an adjustable support 28 so that it may be easily aimed at a transponder 12.

It is important that the data link not be interrupted by objects coming between the T/R head 26 and the transponders 12. In the described embodiment, the transponders are preferably mounted on the ceiling or near the ceiling on a wall. By raising the T/R head 26 to a height of 6 to 7 feet by means of support 28, most normal movements of people and objects in the room will occur below the optical paths between the T/R heads and the transponders.

Referring to FIG. 4, a room is shown in which two workstations 14 communicate with a plurality of transponders 12. In FIG. 4, two transponders 12w are wall-mounted while a third transponder 12c is mounted on the ceiling. The dotted lines 34 represent the area covered by individual transponder beams. The transponder described below and shown in FIG. 5 radiates a beam pattern which is optimized for uniform illumination between approximately 6.5 and 8.5 feet. The individual T/R heads 26 are raised to this level by the adjustable support pole 28.

Figure 5:
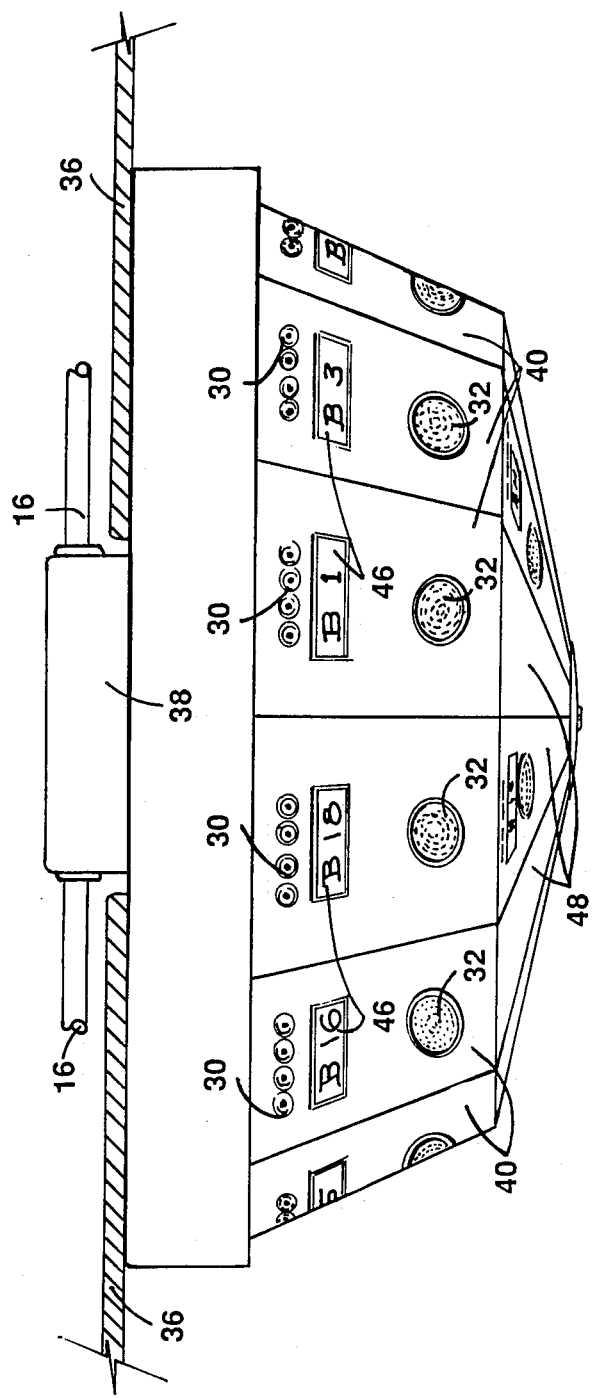
FIG. 5 shows the physical configuration of a transponder.

FIG. 5 shows the physical configuration of a transponder. The transponder 26 is mounted to the ceiling 36. The LAN wires or fiber optics are connected to the transponder through a connector box 38. The transponder is divided into a plurality of circumferential sectors 40. In the described embodiment, transponder 12 includes 16 sectors.

Figure 6:
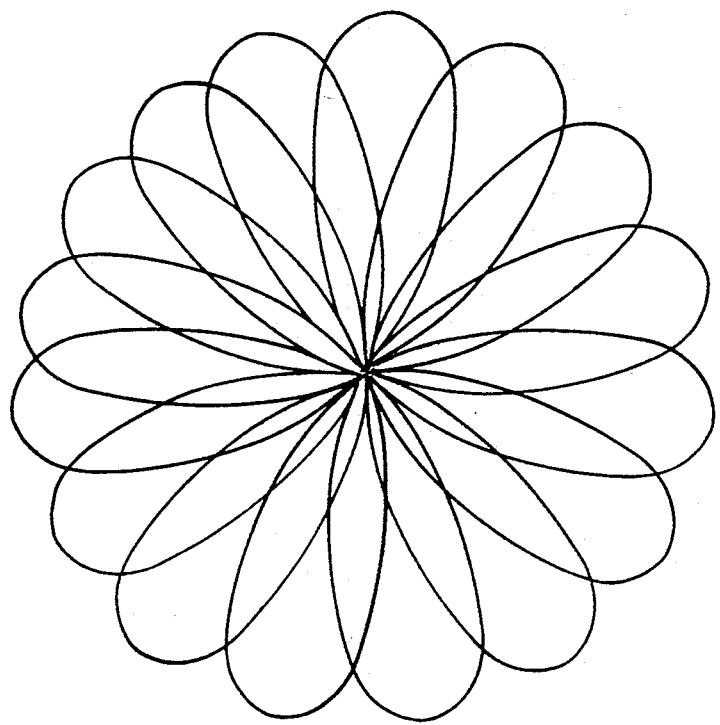
FIG. 6 shows a typical radiation pattern of a transponder.

Each sector 40 includes transmitting LEDs 30 and the receiving optics and photo detectors 32. The individual sectors 40 may be identified with labels 46 for initially setting up the system and for identifying which sector a workstation may be communicating with. FIG. 6 shows the horizontal antenna pattern which would be produced by a transponder having 16 sectors covering 360 degrees.

A second set of sectors may be added to the transponder covering a 360 degree arc but are directed at a different vertical angle. For example, in FIG. 5, a second series of 16 sectors 48 could be provided on the lower surface of the transponder which is aimed at a lower angle than the upper sectors 40.

Figure 7:
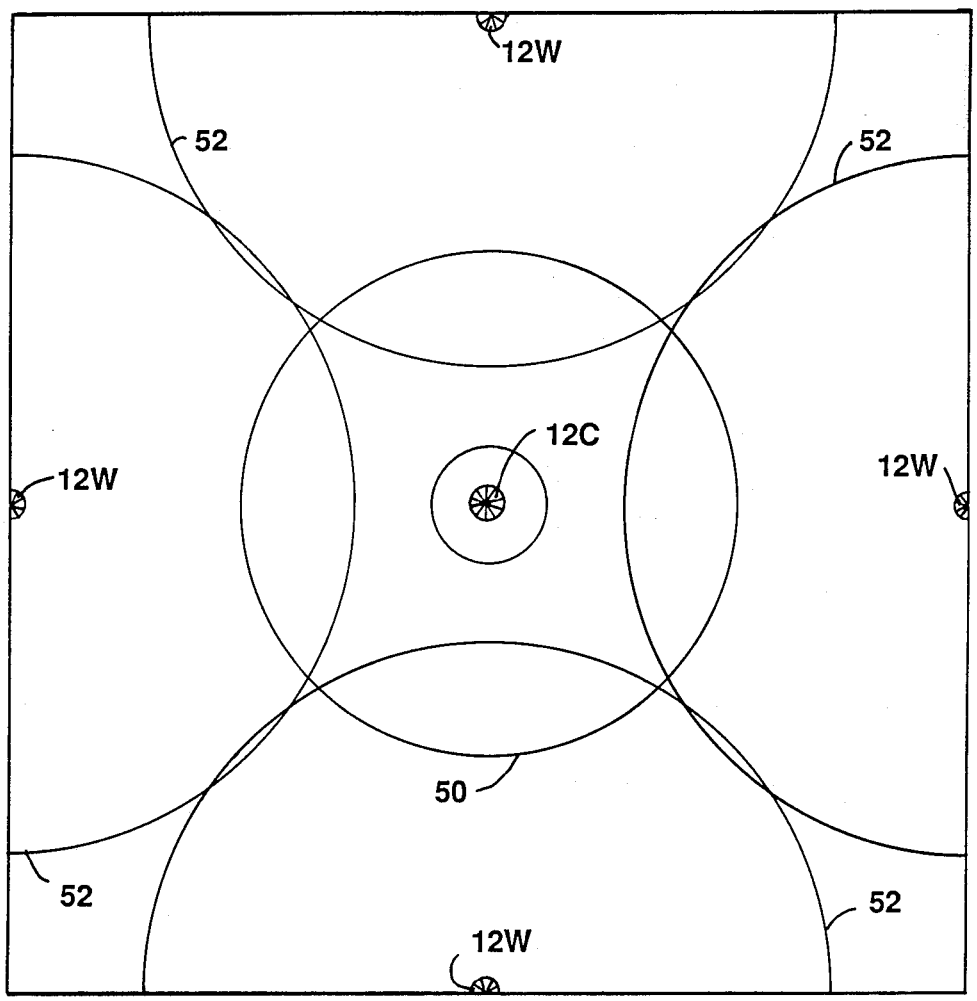
FIG. 7 illustrates the coverage of a room with multiple transponders.

FIG. 7 illustrates how a plurality of transponders 12 might be placed to provide essentially complete coverage over a small room, approximately 25 feet by 25 feet. In FIG. 7, a central transponder 12c is located in the center of the room and provides coverage over an area denoted by the circle 50. Four transponders 12w are mounted next to or on the four walls of the room and provide coverage denoted by circles 52. The arrangement of FIG. 7 can be extended to cover large areas. As will become clear in the discussion below, the present system allows a large number of transponders to be interconnected to provide coverage over a large area while minimizing or eliminating interference between individual transponders.

Figure 8:
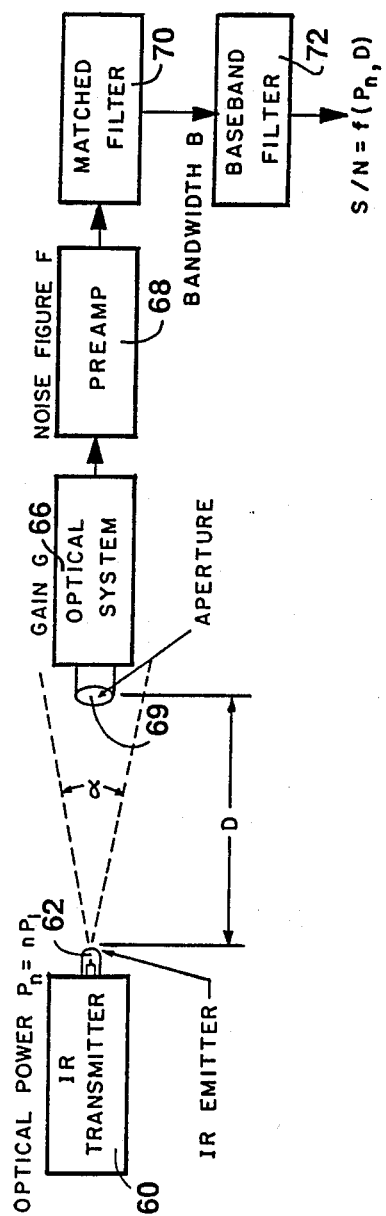
FIG. 8 is a block diagram of the optical system of the present invention.

In order to provide an acceptable system, the bit error rate of transmitted data must be approximately $10^{-9}$ or lower. The present system is capable of providing a system which meets this performance criteria. FIG. 8 shows the major blocks of the system and will be used to estimate the signal-to-noise ratio and bit error rate of the system. The infrared transmitter 60 drives one or more LEDs 62. The LEDs transmit an infrared beam over a conical angle of α. The infrared signal is transmitted over a distance D where it impinges upon the lens 69 of the receiver optical system 66. Optical system 66 has an effective gain of G, which is a function of the photo detector diodes and the aperture of the objective lens of the optics. Since the optical gain does not add noise to the system, it is important to make G as large as possible.

Figure 9:
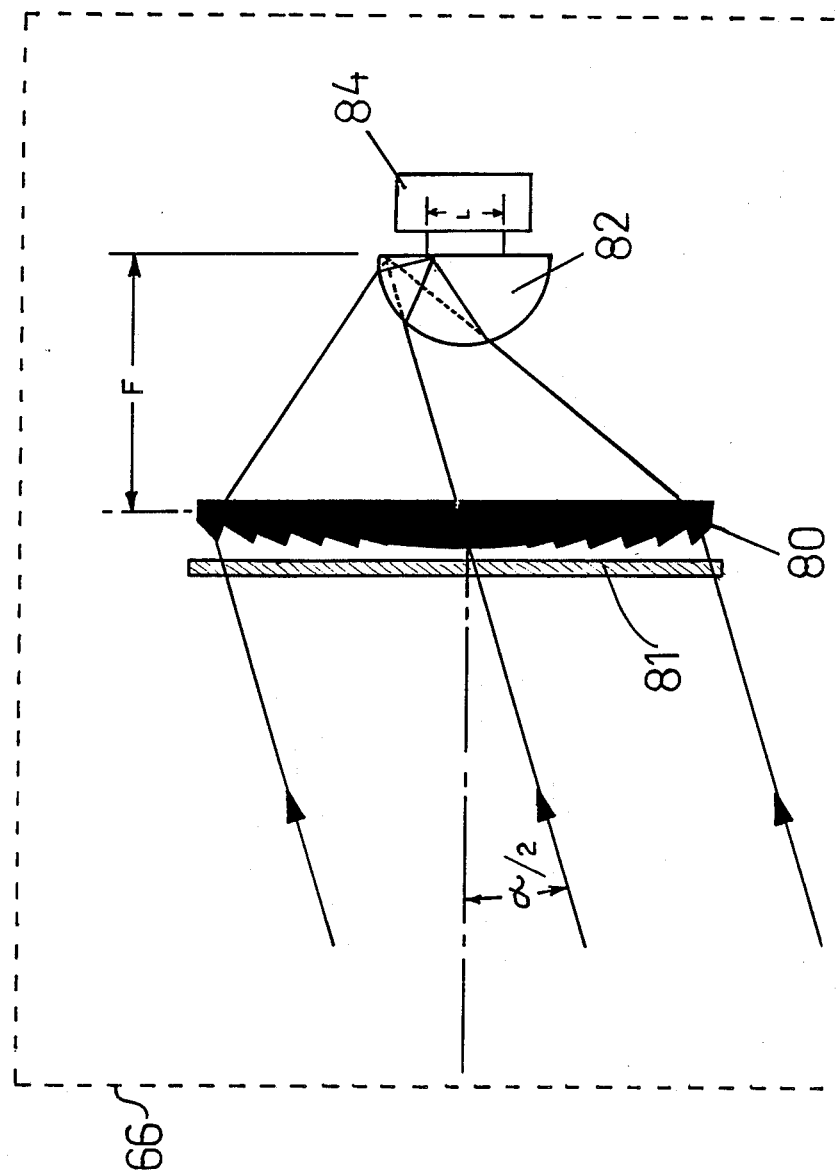
FIG. 9 illustrates a lens system for use with a receiver.

The optical system of the described embodiment is shown in FIG. 9. In FIG. 9, the objective lens of the optical system is a Fresnel lens 80. Optical quality acrylic plastics may be used to fabricate lens 80. Interference by room light is prevented by an optical infrared bandpass filter 81. The function of 81 could be combined by designing the Fresnel lens 80 with the desired bandpass for infrared (a dye). Such plastics have optical losses of less than one dB through 3 millimeters of material at the most common spectral lines for infrared emitter diodes: 850 nm, 1300 nm, and 1550 nm. Using such material, a Fresnel lens objective with an F number as small as 0.5 may be achieved. An immersion lens 82 is located between the objective 80 and the photodiode 84. The index of a fraction of the immersion lens is about 1.5. The optical gain G is equal to the ratio of the lens area of lens 80 and the detector area of the photodiode 84. The gain is a function of the field view, α, of the optical system. With available photodiodes and lenses, a gain of approximately 21 may be achieved with a 36 degree conical beam angle, and a gain of 48 may be achieved with a 24 degree conical beam angle. Large gains are given by smaller beam angles but require more sectors in the transponder.

Figure 10:
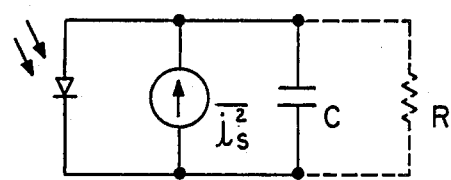
FIG. 10 is a model of a photodiode receiving circuit.

The photodiode 84 will generate electrical noise, including shot noise and Johnson noise components. Referring to FIG. 10, a model of a PIN photodiode for computing the noise therefrom is shown. It is assumed that the parallel and serial resistances internal to the diode are negligible in comparison to the input resistance R of preamplifier 68, which provides the load for photodiode 84. It is also assumed that the diode capacitance C does not introduce amplitude or phase changes for the shot noise. The total noise power $P_N$ is given by the following equation:

$$P_N = 2BR(erp + eI + 2kT/R)$$

where B is the equivalent noise bandwidth of the receiver bandwidth; R is the photodiode load resistor; e is the electron charge; r is the responsivity of the photodiode; p is the received total optical power; k is Boltzmann's constant; and T is the absolute temperature. The received total optical power value p includes photoelectric current due to the ambient light as well as the received signal. In most applications, ambient light power will be an order of magnitude lower than signal power. Photo electric current from room light can be reduced even further, if necessary, by means of an infrared band-pass filter in the optical system 66. The three terms in the equation above represent respectively the light current shot noise term, the dark current shot noise term, and the Johnson noise term. Of these three components, the Johnson noise term is typically the largest by more than an order of magnitude.

The received signal strength is a function of the power transmitted by LEDs 42, the distance between the transmitter and receiver, and the gain of the optical systems. From this information and the noise power given by the equation set forth above, the signal-to-noise ratio (SNR) at the load resistor across the photodiode is given by the following equation:

$$SNR = \frac{(P = Gr)^2}{\frac{(D^2 2\pi[1 - \cos(\alpha/2)]^2}{2B(erp + eI + 2kT/R)}}$$

where P is the effective power of the LEDs 62 in the transmitter; G is the gain of optical system 66; D is the distance from transmitter to receiver; and is the beam angle in radians.

The signal across the photodiode load resistor is amplified by a preamplifier 68. Preamplifier 68 has a noise figure of F. In the present application, a preamplifier having a noise figure of 4 may be easily achieved. As described in detail below, the present invention preferably uses pseudonoise modulation to encode the digital data on the infrared signal transmitted by the LEDs. The output of preamplifier 68 is applied to a matched filter 70 which detects the pseudonoise encoded data from the on-off modulated infrared carrier. Matched filter 70 also serves to reject any single frequency and frequency bands (spectra) of interferring noise received by the optical system 66. The output from filter 70 is applied to a baseband filter 72 having a bandwidth of B.

Figure 11:
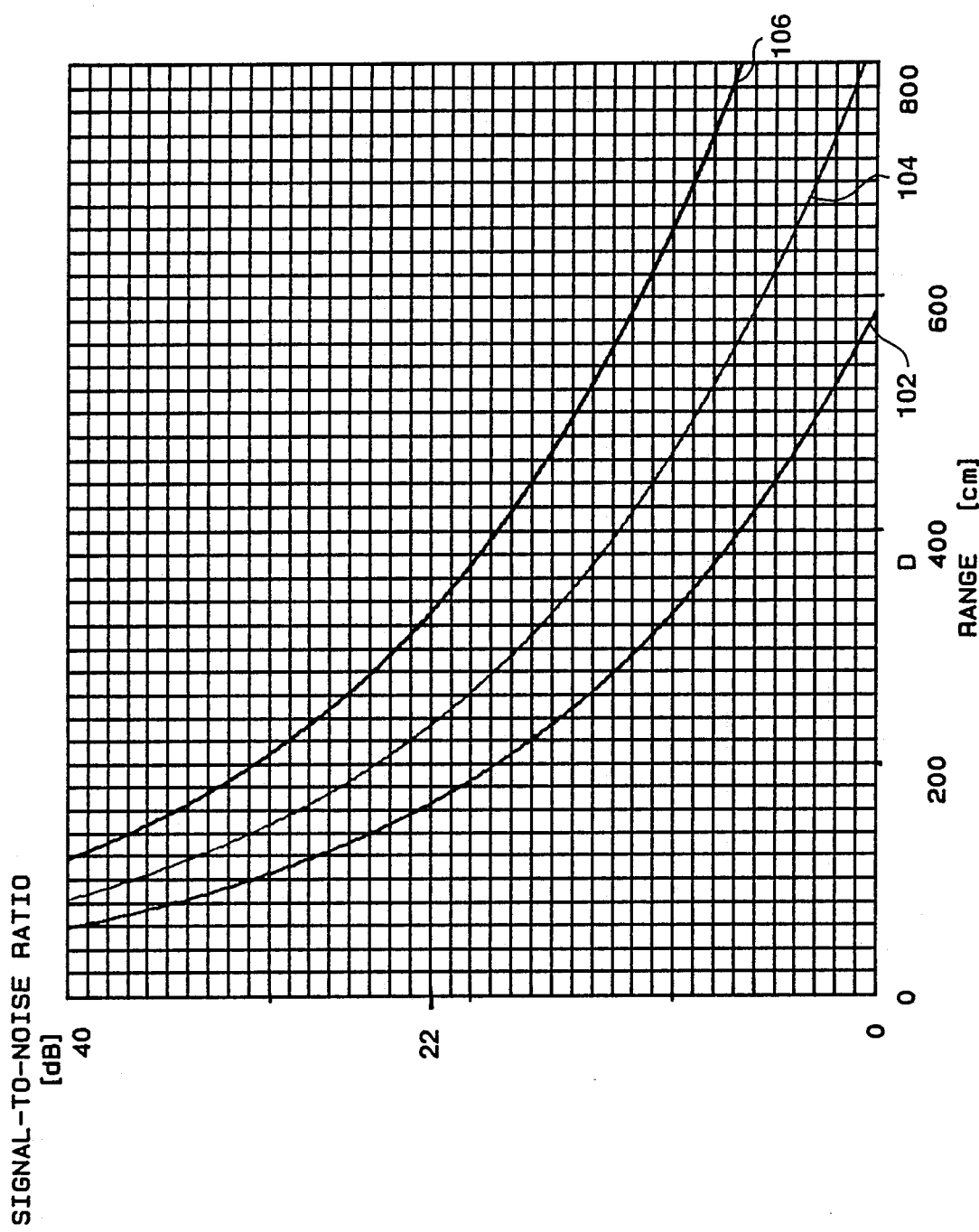
FIG. 11 is a graph showing the signal-to-noise ratio versus range of an examplary system.

FIG. 11 is a graph of the SNR versus distance for the system described above. The parameters for the graph of FIG. 11 include a conical beam angle of 36 degrees and total optical input power of 0.1 milliwatts contributing to the shot noise of the PIN photodiode. For a typical photodiode, such as an Opto-Electronics GD 2000, the responsivity r is 0.35 and the dark current I is 15 microamperes. A load resistance of 50 ohms is assumed. In FIG. 11, curve 102 represents the SNR versus distance function using a single LED with a 36 degree conical angle and having an effective source power of 1.5 milliwatts; and curve 106 represents 6 milliwatts, for a 4 LED transmitter.

In order to achieve a bit error rate of $10^{-9}$, a signal to noise ratio of about 22 dB is required for a modulated waveform when error correction coding is not used. From FIG. 11, it can be seen that the described system has a range of approximately 330 centimeters for a 6 milliwatt power level represented by curve 106. By reducing the field of view to 24 degrees and retaining 6 milliwatt transmitter power approximately 800 centimeters of range will be achieved. The smaller angle, however, will require additional transponder sections.

Figure 12:
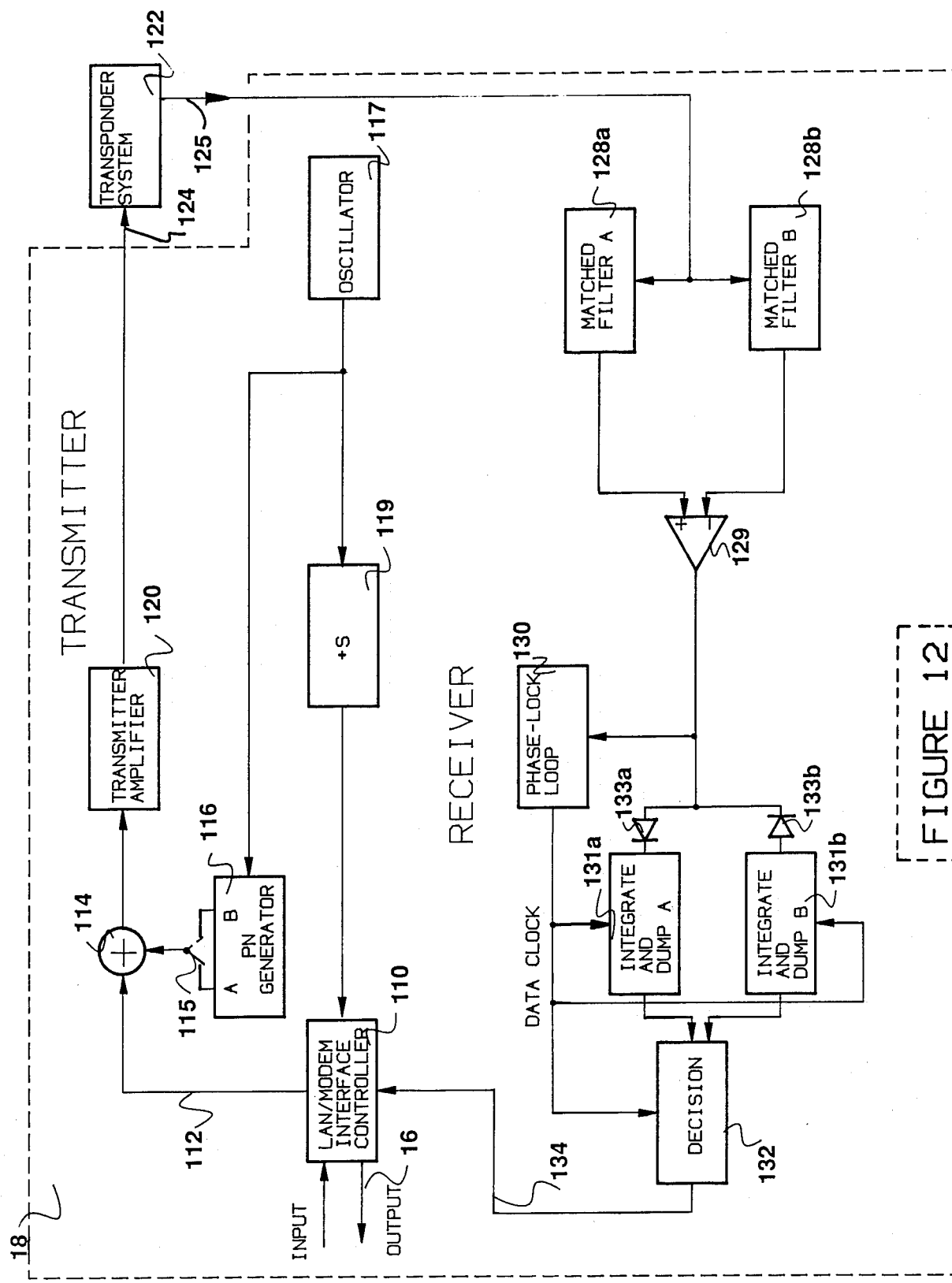
FIG. 12 is a block diagram of a transponder modem.

FIG. 12 is a block diagram of the transponder modem 18. A LAN/modem interface controller 110 is connected to the LAN data channel 16. The exact configuration of controller 110 depends upon the type of LAN used and the network protocol. Controller 110 receives from the network digital data to be transmitted by the transponder, and also sends over the network digital data received by the transponder from a remote workstation. The configuration of controller 110 will depend upon the exact nature of the LAN to which it is connected, and the design of controller 110 can be readily carried out by one of ordinary skill in the art.

Digital data to be transmitted by the transponder is applied by controller 110 on line 112 to a modulator circuit 114. In the preferred embodiment, the data is converted to pseudonoise (PN) modulated sequences before being used to modulate or key the infrared signal transmitted by the LEDs. A PN generator 116 provides the selected PN sequences either by sequence A representing a digital 1, or by sequence B representing a digital 0 selected by switch 115. The PN sequences are applied to a modulator 114, which may be implemented by means of a modulo-2 adder or a gating circuit. In response to the digital data on line 112, the output of modulator 114 are the corresponding sequences from PN generator 116 of which one is the complement of the other.

Different PN sequences are used to represent different digital values. The described system uses a selected PN sequence to represent a digital 1 and the complementary PN sequence to represent a digital 0. By using additional PN sequences, multi-bit digital values may be transmitted to increase the data rate without increasing the chip rate of the PN sequence. For example, two different PN sequences and their complements may be used to encode the four digital values 00, 01, 10, and 11. Using additional PN sequences requires extra matched filters and (coding and decoding) circuitry for detecting and translating the additional sequences in the transponder and workstation modems. In the described embodiment, the matched filters and decoding circuits are easily implemented by means of delay lines in analog or digital construction with operational amplifiers. Providing additional matched filters and associated circuits may be done relatively inexpensively.

In certain applications, this additional circuitry may be justified by the benefit of keeping a lower chip rate which allows the use of lower speed circuitry without decrease in the data rate.

The use of pseudonoise modulation has several advantages. Demodulating the PN modulated signal reduces errors which might otherwise be caused by infrared sources generating signals over a limited spectral range. PN encoding additionally may be used to provide several different wireless channels in the same area by using different PN sequences to modulate the different channel signals. Additionally, when used with delay circuits in a multiple transponder system as described below, PN modulation can reduce or eliminate multipath interference between signals from several different transmitters which are received by a single receiver.

The time base for PN generator 116 is provided by an oscillator 117. In the described embodiment, the frequency of oscillator 117 is 60 MHz and sets the 60 Mbps chip rate for each sequence. The signal from oscillator 117 is applied to a divider 119 which divides the time base signal by a factor S, which is equal to the number of chips in each PN sequence. The output from divider 119 corresponds to the data rate at which information is sent and received by the transponder, and is applied as a data clock signal to interface controller 110 to produce data frame timing and data packet timing suitable for the chosen LAN environment.

The output from modulator 114 is applied to an amplifier 120 which increases the power of the signal. The output of amplifier 120 is connected to the transmit line 124 as input to the power amplifier 220, FIG. 18, of the transponder LEDs. The LEDs are turned on and off in response to the PN modulated digital signal to provide the infrared transmission for this embodiment or the PN sequences are modulated on an RF carrier with one of the standard digital modulation schemes: FSK, DPSK, QPSK, MSK, etc.

Figure 18:
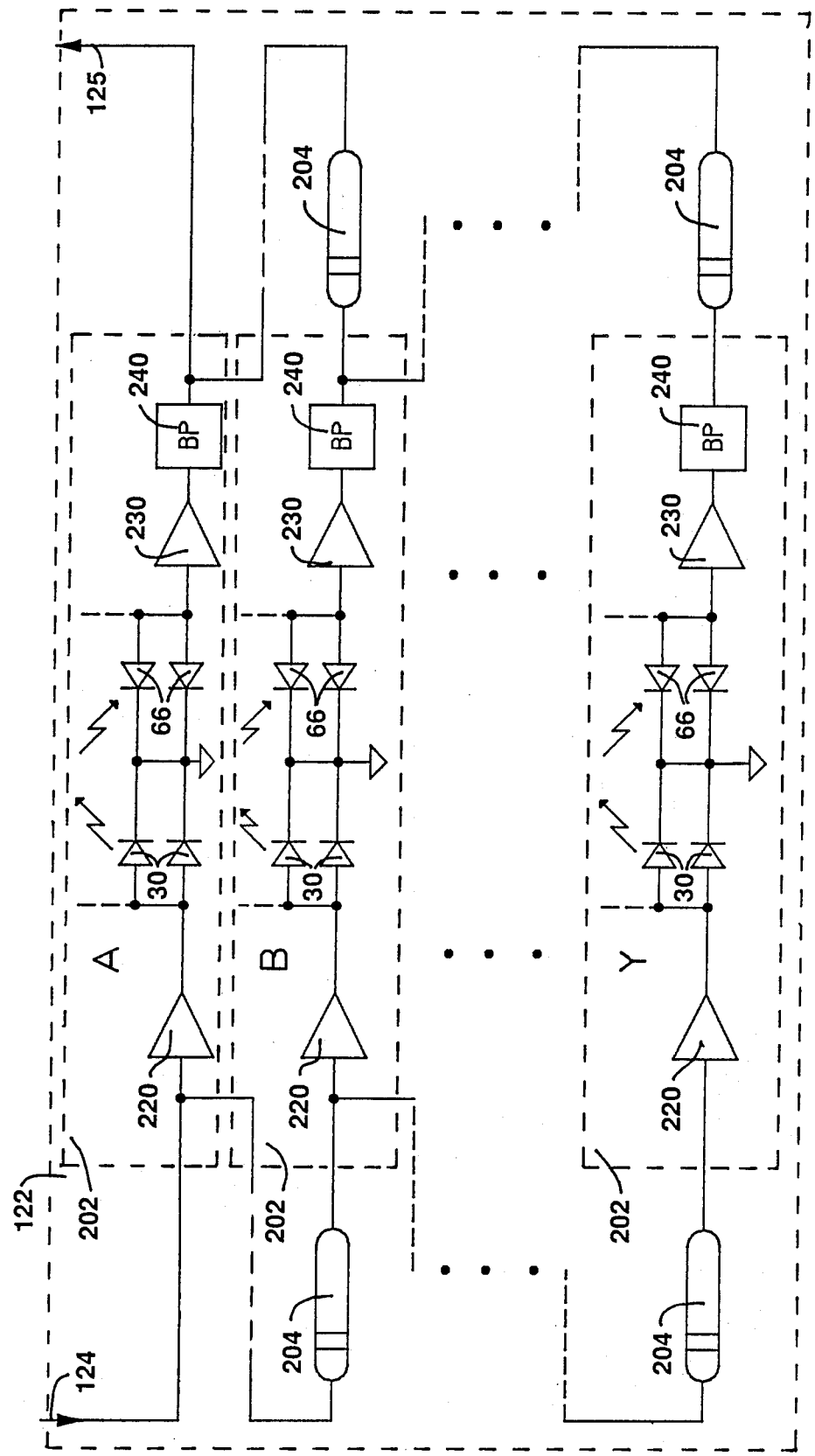
FIG. 18 shows the transponder system.

As described above in connection with FIG. 5, transponders are constructed with a number of different sectors, each of which cover a limited area. Each transmitter in each sector may optionally be activated or deactivated by a controller in response to instructions as to the destination address of the packet provided by the LAN. Sector by sector control of transmitters is not necessary. Each transponder may operate all its sectors in unison without utilizing sector addressing as shown by FIG. 18.

The receiving section of the transponder is shown in the lower part of FIG. 12. Infrared signals received by the antenna of the transponder system 122 are applied to matched filters 128a and 128b by receive line 125. The matched filters 128a and 128b detect the presence of PN signals and in response thereto generate a positive pulse either by matched filter A or by matched filter B at its respective output, representative of a digital 1 or digital 0 data bit PN sequence. Matched filters 128a and 128b may be implemented by means of charge coupled devices, tapped delay lines, surface acoustic wave devices or by other circuits known in the art.

The outputs from matched filters 128a and 128b is applied to a differential amplifier circuit 129 for generation of a bipolar digital signal and for common mode noise cancellation. The output from 129 is applied to integrate and dump circuits 131a and 131b or other type of filters for separate integration of the negative and positive portion of the bipolar signal. A phase-lock loop 130 provides a stable charge/discharge command in data sync to the integrators. The output from integrate-and-dumps 131a and 131b is applied to a summing, limiting and decision circuit 132.

In response to a received PN signal, the output from decision circuit 132 will be bipolar, i.e. positive or negative in amplitude reflecting the digital value represented by the received waveform. If no signals are being received or are below a given threshold, the output from 132 will be zero, indicating a lost signal. The diodes 133a and 133b in front of the integrate-and-dump circuits are selecting the polarity of the to be integrated signal: positive for the digital 1 and negative for a digital 0.

The larger magnitude of the 131a and 131b output is selected by the decision circuit 132 as a logic "1" or "0" representing the recovered data. Interconnection 134 transmits the recovered data to the LAN/interface controller 110 with LAN inbound and outbound cables 16 of the LAN channel.

Figure 13:
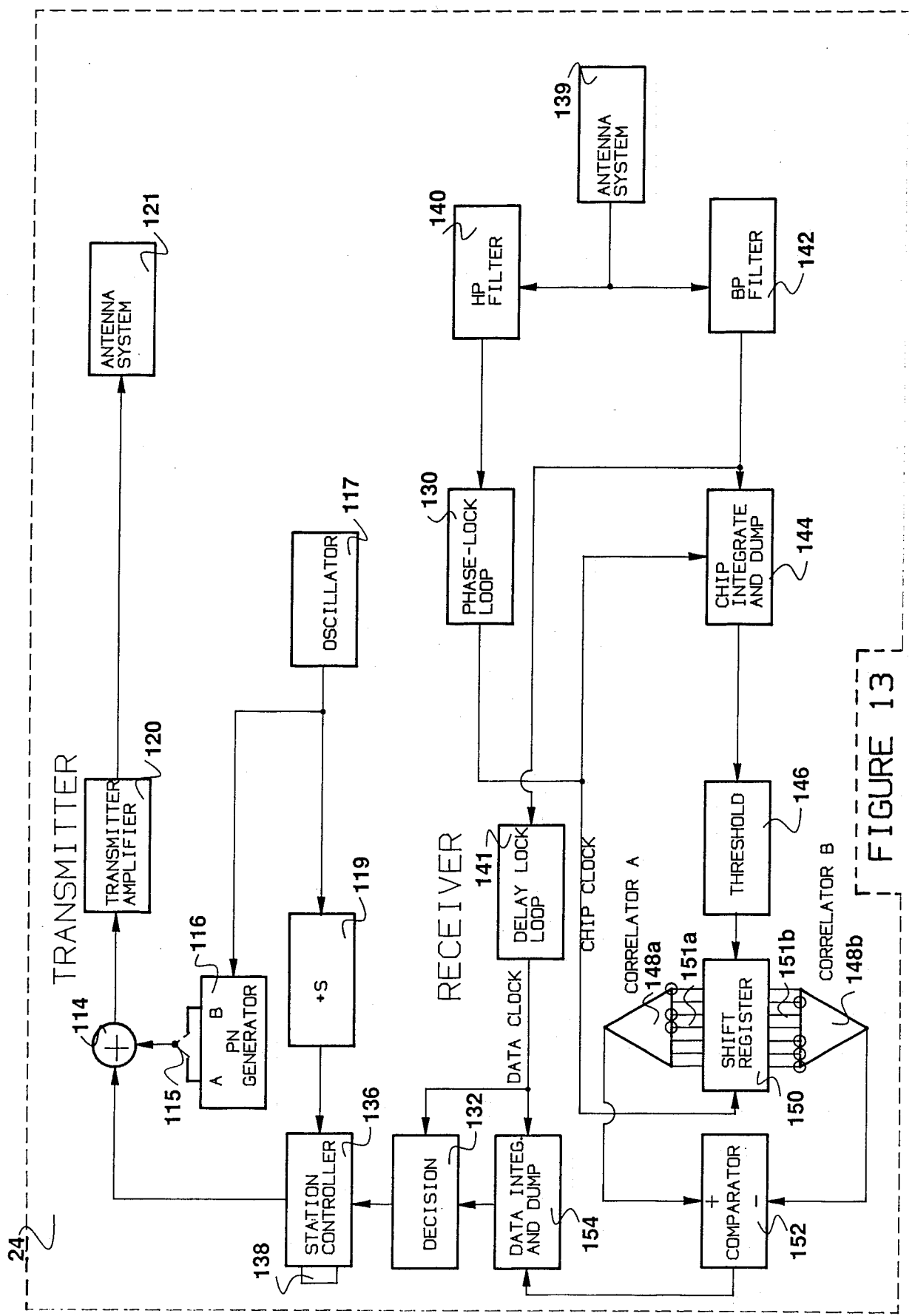
FIG. 13 is a block diagram of an infrared station modem.

FIG. 13 is a block diagram of a typical infrared station modem 24 which would be used with remote workstations. The modem interfaces with the workstation by means of a station controller 136. Controller 136 is connected to the workstation by a port 138 which could be either, a high speed port or a standard RS232 port. In the described embodiment as a separate unit or it is located within the workstation as a plug-in board and an antenna system 26 on the outside of the workstation. Data from the workstation is applied to the transmitting circuitry in the infrared station modem by the station controller. Station controller 136 receives data from the receiving circuitry in the infrared station modem and applies this data to the workstation. Controller 136 may include memory for buffering the data received and transmitted and packet decoding and coding functions. Communication controller cards are available for performing the functions of station controller 136, and the configuration of the controller will depend upon the individual application.

The transmitter circuitry 114–121 in the infrared station modem 24 is similar to the transmitter circuitry in the transponder modem 18 in FIG. 12. The transmitter antenna system 121 is part of the T/R head 26. As described above, the data clock applied to controller 136 is derived from the PN sequence chip rate oscillator 117 via divider 119 which divides the oscillator output by the PN sequence length.

The station modem receiver uses correlators 148a and 148b to demodulate the PN encoded data loaded on shift register 150, in this example by 7 bits. The signal from the receive optical antenna system 139 after passing through bandpass filter 142 is applied to a chip integrate-and-dump circuit 144 for synchronous chip recovery with the aid of the phase-lock loop 130 and high-pass filter 140 for selection of chip transitions from the signal. The delay-lock loop 130 recovers the data sync for the data integrate-and-dump 154 and decision circuit 132. A threshold circuit 146 following 144 determines the presence of a chip "1" if a given threshold is exceeded, if not a chip "0" is assumed. The shift register 150 receives the reconstructed PN sequences from 146. PN sequence matching occurs when seven inputs of the summation amplifier of one of the two correlators 148a or 148b coincide with the preset chip PN sequence or its complement. The two PN sequences, in this embodiment, are preset by PN code dependent inverting and non-inverting of summing amplifier inputs 151a and 151b. Comparator 152 selects the higher correlation peak magnitude of 148a and 148b for integration by the data integrate-and-dump circuit 154. The output from the integrate-and-dump 154 is applied to a decision circuit 132. Decision circuit 132 applies the recovered data to the station controller 136 for processing by the workstation or indicates the loss of data.

At high transmission rates, the reception of a delayed PN signal in addition to the desired signal can interfere with the desired signal and alter the correct identification of the data bits. For example, at a chip rate of 60 Mbps, each chip requires approximately 17 nanoseconds in duration. Reflections or signals from other transponders having a propagation path in excess of 15 feet have their relative positions shifted by one or more chips of the transmitted signal. In order to avoid errors from these sources, multipath reduction techniques must be used.

Figure 14:
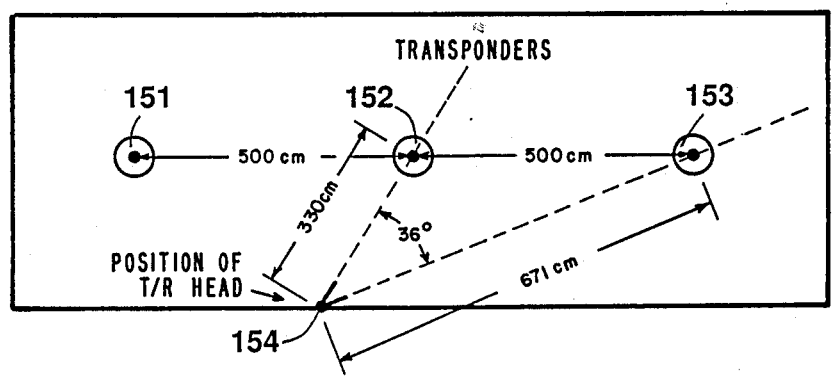
FIG. 14 illustrates how interference may be reduced by maintaining a minimum transponder spacing.

Keeping a minimum to transponder distance in conjunction with a fixed minimum detection threshold will prevent a receiver from locking onto a more distant transponder. In FIG. 14, a worst case situation is shown for the described embodiment in which the field of view is 36 degrees and the maximum range for each work station is set to 330 centimeters. In FIG. 14, a plurality of transponders 151–153 are located at a minimum distance of 500 centimeters from one another. A workstation modem 154 has its antenna oriented so as to communicate with transponder 152. Interference from other transponders will occur only if the transponder is within the 36 degree field of view of the workstation modem. The worst case scenario in FIG. 14 shows that this occurs when workstation modem 154 is located at a distance 330 centimeters from transponder 152. In this case, the interfering transponder 153 is approximately 670 centimeters from modem 154, and signals from transponder 153 will fall below the detection threshold but will add or subtract from the desired signal. Similar reasoning applies to reflections from walls and other surfaces. Keeping the transponders at a minimum distance from the wall will ensure that these reflections do not cause signal powers reflected. In practice, interference from surfaces are much lower than from adjacent transponders as a result of reflectivities of less than 100 percent and diffusion of the reflected signals. The SNR of the signal from transponder 152 will be degraded by a small amount as a result of the interfering signal from transponder 153. Assuming a SNR versus range function corresponding with curve 106 in FIG. 11, the SNR of the signal from transponder 152 will be degraded by less than 1 dB as a result of interference from transponder 153, when received by a modem at location 154.

Figure 15:
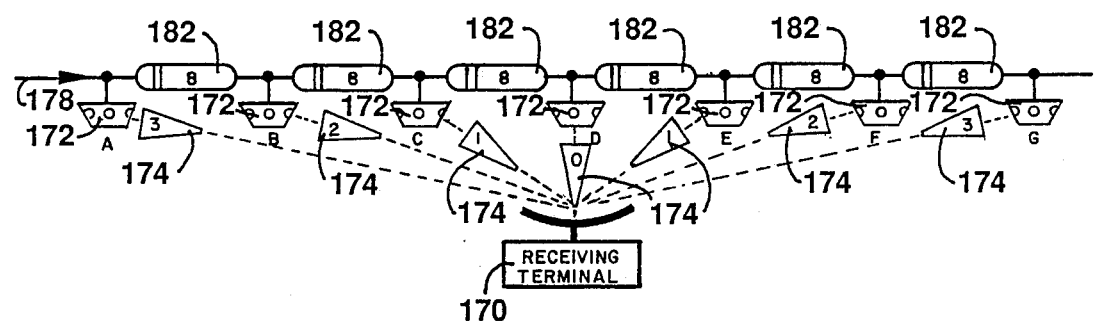
FIG. 15 illustrates the use of delays between transponders to elimate multipath interference when multiple transponders are used in a single line.

FIG. 15 shows a simplified, linear arrangement of transponders and will be used to explain an alternate method of providing discrimination against multipath signals in situations where more than one transponder may be within the reception area (including both field of view and signal threshold) of a receiving terminal. Here, a minimum distance $L_{MIN}$ between transponders as a function of $R_T$, the transmission rate of the system, is determined by $$L_{MIN} = C/R_T \tag{1}$$

where C=the speed of light. This constraint separates any unwanted free-space inputs to a receiver by at least one chip (one bit in sequence of bits) of a pseudo-noise sequence with S chips.

Also d, an introduced optimum signal delay between transponders is specified as $$d = S/2R_T \tag{2}$$

where S is an odd code length of a pseudo-noise sequence.

Equation (2) can be normalized in terms of units of free-space transponder-to-transponder delays over $L_{MIN}$ by dividing equation (2) by $1/R_T$, the chip duration, and obtain $$d_{NORM} = S/2 \tag{3}$$

The concept of free-space delays in $1/R_T$ units simplifies the understanding of the coding effect on the multipath rejection. For example, with $R_T = 60$ Mb/s and a pseudo-noise sequence with S=15, we obtain d=125 ns, $d_{NORM} = 7.5$, and $L_{MIN} = 5$ m. Multipath and interfering noise is reduced by 101 og S=11.8 dB.

FIG. 15 shows a receiving terminal 170 having a wide angle receiver with a nearly 180 degree field of view receiving signals from a plurality of transponders 172, which are labeled A through G in FIG. 15. The transponders are separated by a distance equal to the free space propagation distance traveled by the IR signal during one chip.

The propagation paths from each of transducers 172 to receiver 170 are illustrated by dotted lines in FIG. 15. A propagation delay is associated with each of these paths, and the magnitude of the delay is proportional to the length of the path. The delay measured in chip durations and associated with each path is represented in FIG. 15 by the number within triangles 174. The propagation delay associated with transponder D will be assumed to be zero. The propagation delays associated with the other transponders are essentially proportional to the horizontal distance of each transponder from receiving terminal 170. The system of FIG. 15 has transponders 172 separated by approximately 5 meters, with normalized free-space delays of 1 between them.

Figure 17:
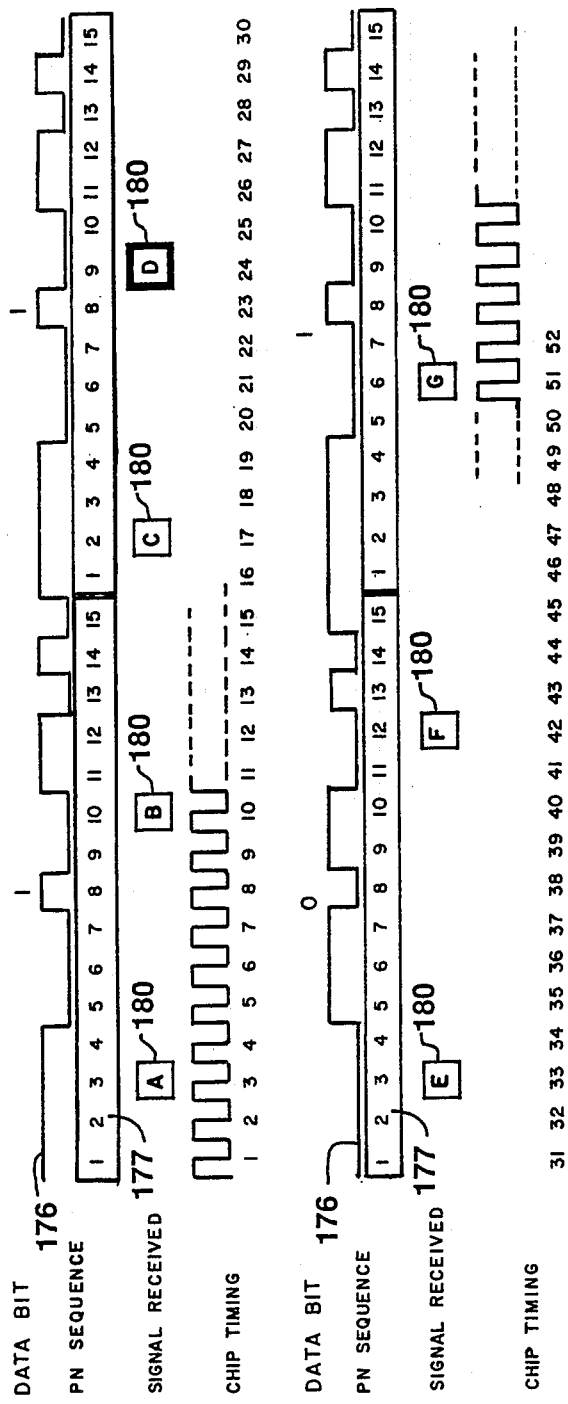
FIG. 17 shows waveforms useful in explaining FIG. 15.

FIG. 17 shows waveforms useful in explaining the system shown in FIG. 15. In the example shown in FIG.

15, a PN sequence 15 chips long is used. The sequence is represented by the digital waveform 176 in FIG. 17. The PN sequence or its complement is transmitted by each of the transponders as a function of the data bit being sent, as shown in FIG. 17. The numbers 177 beneath waveform 176 represent the chip position in the PN sequence.

The signals to be transmitted to receiver 170, FIG. 15, are applied to transponders 172 along a data transmission cable 178. The signal from transponder D is the desired signal to be selected and received by receiver 170. By introducing delays 182 in transmission path 178 between each of the transponders 172, the timing of the PN modulated signal received by receiver 170 will be such that multipath interference from transponders other than D will be out of sequence with the locally stored PN codes used to demodulate the desired signal in receiver 170. As a result, these unwanted signals will be rejected by the receiver. In order to achieve this rejection, the receiver 170 must be synchronized with the signals from transponder D in FIG. 15, and a correlating or matching demodulator as shown in FIG. 13, FIG. 12, or equivalent circuitry for demodulating the PN signals, must be used.

In FIG. 15, a delay line 182 is inserted in the transmission path 178 between each of the transponders 172. In the example shown in FIG. 15, the delay provided between each transponder corresponds to 8 normalized free-space delays, equal to 8 chip durations. A normalized delay of 1 chip unavoidably occurs due to the propagation time of the signal along the cable 178, and thus an additional delay of 7 chip durations, rounded off from 6-½ normalized free-space delays, has to be added by additional delays. The delays 182 change the relative timing of the PN sequences from each transponder 172 as received by terminal 170 to achieve multipath rejection.

In FIG. 17, the relative timing of the signals received by receiver 170 from each transponder 172 is shown by the boxes 180. At the instant depicted by FIG. 17, box 180 labelled D corresponds to the 9th chip of the PN modulation sequence. The combination of propagation delays 174 and transmission line delays 182 will result in additional signals from transponders A–C and E–G having the timing relationship shown by correspondingly labeled boxes 180 in FIG. 17. At the point in time illustrated by FIG. 15, the signal from transponder D received by terminal 170 is at chip 9 in the PN sequence. Signals from transponders A, B and C are received at chip positions 3, 10, and 2 respectively while signals from transponders E, F, and G are received at chip positions 3, 12, and 6, respectively. For the system shown in FIG. 15, the nearest transponder which will produce a signal at receiver 170 with the same chip position in the PN sequence detected at transponder D (i.e., chip 9) would be located 5 transponders to the right of transponder D in transmission line 178. The large attenuation of this unwanted multipath input results in a signal which is negligible with respect to the desired signal from transponder D.

The above example uses a 15-bit sequence which is a true digital pseudonoise sequence. Strictly speaking, in order to be a perfect pseudonoise sequence, several conditions must be satisfied. The autocorrelation function of the sequence must equal the sequence length for zero offset and must equal minus 1 for other offsets; the number of 1's and $-1$'s must not differ by more than one; and for the sequence, half the runs (of all 1's or all $-1$'s) must have length 1, one-quarter have length 2, one-eighth have length 3, etc. If all these conditions are satisfied, the sequence is a true pseudonoise signal and will approximate white noise.

There are other sequences, however, which, are not strictly speaking true pseudonoise sequences but which do have similar characteristics. For example, Gold codes are a well-known set of periodic binary sequences whose autocorrelation functions have a single peak for zero offset and a very low value for all non-zero offsets and which have low cross-correlation values. While not satisfying the second two criteria set forth above, the characteristics of Gold codes approximate white noise. Gold codes may be used as the modulating PN sequences in the present invention. Gold codes have the advantage that for most lengths, more Gold codes exist than true pseudonoise codes. The additional codes may be used, for example, to encode a larger number of multi-bit digital values, as described above, or to provide additional non-interfering communication channels within the same area. In many applications, for example, it may be desirable to use different PN sequences or signals transmitted by transponders and signals transmitted by the workstation modems. This ensures that the receiving circuitry in a group of workstation modems will not respond to PN modulated signals transmitted by other workstation modems, i.e. a secure channel reserved for encrypted messages.

Other periodic digital sequences exist which approximate true pseudonoise sequences and which are equivalent to true pseudonoise sequences for the purposes of this invention. Accordingly, the term "PN sequence" as used herein should be understood to include both true pseudonoise sequences and other sequences having autocorrelation functions characterized by a large value for zero offset and a comparatively small value for other offsets, so that a receiver may distinguish undesired multipath interference by means of a correlating demodulator or the like.

For purposes of simplifying the explanation, FIG. 15 was restricted to a linear or one dimensional arrangement of the transponders 172. In most applications, a room having multiple transponders will have an array of transponders arranged over a two dimensional area. Such an arrangement is illustrated in FIG. 16.

Figure 16:
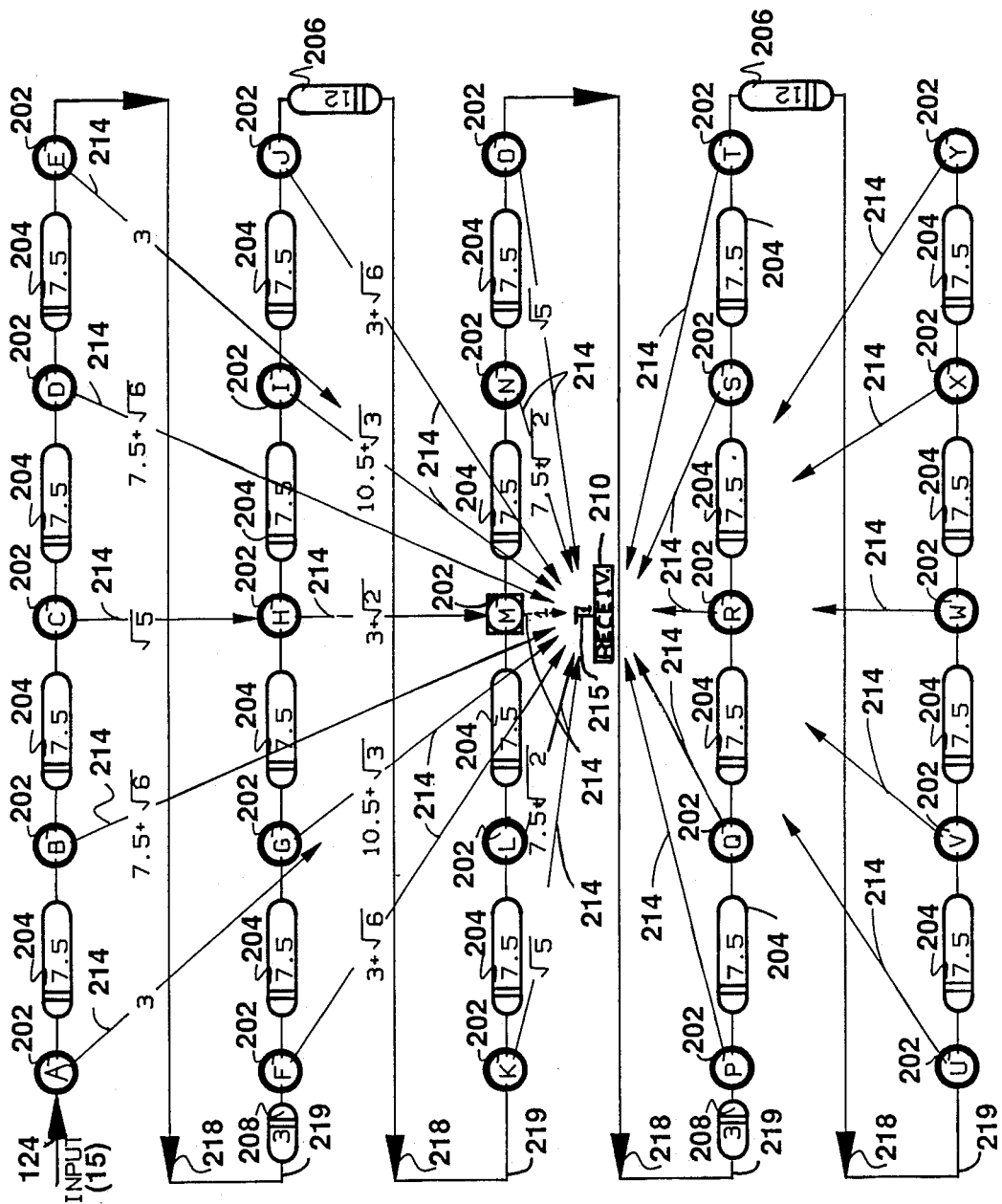
FIG. 16 shows how delays between transponders may be used to eliminate multipath interference with transponders arranged in a two-dimensional matrix.

In FIG. 16, a plurality of transponders 20 are identified with the letters A, B, C, etc. These transponders are arranged in a five by five rectangular matrix. The PN sequence length and frequency are the same as for FIG. 15, and the separation between transponders 202 along the rows and columns is also approximately 5 meters. The free-space propagation delay between adjacent transponders along the same row or column is equal to approximately 17 nanoseconds or 1 chip duration.

Each of the transponders 202 is serially connected to the following transponder in the same row via a delay line 204 having a normalized delay of 7.5. The final transponder in each row is connected to the first transponder in the next row through delays 206 and 208, as described below. Underneath transponder M at a distance of 1 normalized free-space delay, in this embodiment equal to 5 meters, is a receiver 210. The configuration of the bottom half of the transponder matrix is the mirror image of the top half and has equal free-space delays to the receiver 210.

For purposes of this explanation, it will be assumed that receiver 210 is to receive signals from transponder M and reject signals from the other transponders in the matrix. As explained below, the configuration shown in FIG. 16 results in the PN sequences from all other transponders being offset sufficiently from the sequence received from transponder M that they will be rejected by receiver 210 when the PN sequence used to demodulate the received signal is synchronized with the signal from transponder M. At the instant depicted in FIG. 16, receiver 210 is receiving chip 1 of the 15-bit PN sequence from transponder M, as represented by the 1 below omni-directional receiver antenna 215. Receiver 210 also receives signals from the remaining transponders in the matrix.

The PN modulated input signal is applied to the initial transponder A. This signal is applied to the remaining transducers through the delay line, as shown in FIG. 16. The instantaneous value of the input signal in FIG. 16 is at the 15th chip in the PN sequence, which is the equivalent of zero. (i.e., 1 chip forward in time from 15 is 1, 2 chips forward is 2, and so forth.) The normalized free-space delay of the signal received from each transponder is equal to the chip number and is represented by the value in each of lines 214, which represents the transmission path from each respective transponder to the receiver 210. The chip position of the signal received by receiver 210 from each transponder 202 is a function of two factors: the electrical delay between the input 124 and the particular transponder, and the free-space propagation delay between the transponder and receiver 210. For this embodiment a delay of 7.5 normalized free-space delays, identical to 7.5 chip durations, was chosen between the transponders.

The relative chip position of the signal from a transponder 202 received by receiver 210 is equal to 3. There is no electrical delay between the input and transponder A. The propagation delay is 3 chip durations long and can be computed by $\sqrt{w^2 + 1^2 + h^2}$ with w, the width in number of chip durations facing the receiver, 1 the length in number of chip durations toward the receiver and h the height in number of chip duration (we consider only 1) vertically under transponder M.

The relative chip position of the signal from transponder B is equal to $7.5 + \sqrt{6}$. This value results from the delay line 204 between transponders A and B which provides a delay of 7.5 normalized units (or chip durations), and the free-space propagation delay which is equal to $\sqrt{6}$ chip durations. The relative timing of signals from the other transponders is as shown in FIG. 16 by paths 214.

While the configuration shown in FIG. 16 is implemented by means of a serial connection of the transponders 202 and the various delay line elements, other configurations may be used. For example, each of the rows of transponders shown in FIG. 16 may be driven in parallel to provide the same timing relationship as shown in FIG. 16. In order to achieve such a parallel combination, the conductors 218 connecting each row to the following row would be disconnected, and the input signal would be applied to the beginning of each line at the points indicated by 219. As can be seen by inspecting FIG. 16, the sum of the delays in each row (including the intra-row delays 204, the end-of-row delays 206, and the front-end delays 208) provides a total delay from the beginning of each row to the beginning of the next row of 45 chip durations. Since this is an integral multiple of the 15 chip length of the PN sequence, the effective shift of the PN sequence between rows is zero. Thus, applying the same signal to points 219 of the second through fifth rows to drive each row in parallel provides the same timing configuration with respect to the PN sequencing as the serial connection shown in FIG. 16. In a practical application, the beginnings of each row will be separated spatially, and the delays along the connections between the source of the input signal and the beginning of each row must be the same or an integral multiple of 15 chip durations. This may be easily accomplished by connecting the input signal source to each row via equal length cables. Alternatively, additional delays can be used to compensate for any variance in the propagation delay.

The above explanation was for a receiver located 5 meters below transponder M. In a practical situation the array would have multiple receivers located at various places within the transponder array. By carrying out the calculations similar to those above, it can be shown that a receiver which is receiving signals from the nearest transponder will reject interference from signals transmitted by other transponders. In this manner multiple transponders may be installed to provide coverage over a large area without multipath interference even with omni-directional antennas.

It should be appreciated that the models shown in FIGS. 15 and 16 have assumed that the receivers would have a field of view which includes all transmitting transponders. In actual practice, this may not be the case, and the restricted field of view of a practical receiver will provide further protection against multipath interference, since only a limited number of transponders will be within the field of view and range of a particular receiver. It should be appreciated that systems for avoiding multipaths shown in FIG. 15 and FIG. 16 may use wireless channels other than the infrared networking system described herein. For example, the transponders 202 in FIG. 16 could be replaced with microwave or radio frequency transmitters in place of the optical infrared LEDs described.

The models in FIG. 15 and FIG. 16 demonstrate the interference free data reception of a workstation anywhere below a matrix of transmitting transponders. This very useful broadcast capability, however, concerns only the downlink property of this data communication system. The uplink propagation of a wide angle infrared beam or electromagnetic beam by an omnidirectional emitter (antenna) can make use of the very same system properties as explained for the uplink propagation in FIGS. 14, 15, 16, and 17 by the use of PN sequences and introduced delays in the receiver lines of the transponders. In FIG. 18 a single row transponder system is shown with its main components. The transmitted data originating from the transmitter amplifier 120, FIG. 13, is connected by line 124 to the transponders 202 directly or are serially connected by delay lines 204. The transponders A, B and Y are shown schematically and simplified, comprising each of LEDs 30 in arrays and photodiodes grouped in arrays with amplifiers in the embodiment. One power amplifier 220 in each transponder powers all of its LEDs. The receiving antenna of the transponder comprises of photo detectors 66. The lens system of the photo detectors 66 is not shown in FIG. 18. A common preamplifier 230 connected to a bandpass filter 240 provides amplification and filtering for the signals detected by all photo detectors 66 of the transponder. In practical cases at high chip rates individual amplifiers may be required for the transmitter and receiver section of each transponder. The output of the bandpass filters 240 are connected in series with delay lines 204 to the receive line 125 of the transponder modem 18. The exception is transponder A of FIG. 18 which is connected without 204 to receive line 125.

The insertion of delay lines in the common receive signal path of a multitude of connected transponders will produce a signal cancellation of received signals from other transponders upon detection by the matched filters 128a and 128b of modem 18, FIG. 12. Only the signal of the closest transmitting workstation is in data sync with the modem 18 and is detected. Always the strongest amplitude, received from transponder M by modem 18, will sync to the data clock by phase-lock loop 130.

Multipath rejection of a workstation transmitting toward all transponders due to its broad transmit antenna pattern can be demonstrated by reversing of the direction of all arrows of FIG. 16 into the opposite direction. The large arrow heads indicate now the outward signal flow toward the left upper corner of FIG. 16 which represents now the receive line 125 instead of transmit line 124. All lines with small arrow head now represent the propagation delays from workstation transmit antenna 215 of FIG. 16 to the receiver input of the modem 18 by receive line 125. The total propagation time in both, uplink and downlink, is simply the same, and upon matched signal detection the mechanism of multipath rejection by introduced PN sequence offsets is the same. Therefore, the explanations given for FIGS. 14, 15 and 16 for the transponder transmit case does apply for the workstation omni-directional transmit case.

The foregoing has described by way of example a new and useful method of providing an infrared networking system between multiple transponders and workstations which has advantages over previously known systems. It should be appreciated that those of ordinary skill in the art may modify the foregoing example in applying the principles of the present invention to different applications. Accordingly, the scope of the present invention should not be limited by the above description of particular examples, but rather should be interpreted in accordance with the following claims.

What is claimed is:

1. A lightwave spread spectrum system for wireless communication with at least one workstation, factory equipment, data processing or data controlled devices, located within an area, said system having a plurality of transponders, each transponder comprising:
   (a) modulating means for generating at least one of the PN sequences of code length $S_1$, $S_2$ or code lengths $S_n$ with chip rate $R_T$, each sequence being representative of a different digital value, and responsive to a digital data signal applied thereto for providing an output signal of PN sequences representative of the data bits;
   (b) Transmitter means responsive to the modulating means output signal representative thereof;
   (c) receiving means for receiving a PN modulated signal representative of received digital data, and for providing an output signal representative of the received digital data;
   (d) interface means connected to a network and responsive to signals on the network for applying a digital data signal to be transmitted to the modulating means, and responsive to the receiving means output signal for sending the received digital data over the network; and
   a plurality of transponders being located within said area with a minimum separation between transponders equal to $C/R_T$; where C is the speed of light,
   a network connected to each of the transponders;
   a communications channel for providing the digital data signal to each transponder; and
   means for providing time delays in the digital transmission path to or from each transponder where the delay in the data signals received by a workstation or other means is effectively delayed by a time equal to at least $1/R_T$ from each neighboring transponder.

2. The system according to claim 1 wherein the transponders are arranged in at least one row; and
   wherein the transponder transmitters in a row are connected in series with a delay means between each of the series connected transponder transmitters in a row.

3. The system according to claim 2 wherein the separation between each transponder in a row is approximately equal; and
   wherein the delay of the delay means between each of the series connected transponder transmitters in a row is the same.

4. The system according to claim 2 wherein the separation between each transponder in a row is equal; and
   wherein the delay of the delay means are connected to a common transmit line are increasing in time by at least $1/R_t$ with each connected and subsequent transponder transmitter.

5. The system according to claim 3 wherein the transponder transmitters are arranged in a matrix composed of a plurality of rows and columns, the separation between adjacent transponder transmitters along the rows and columns being approximately equal.

6. A system according to claim 5 wherein rows of transponder transmitters are connected in series by a delay means having a time delay different from the delay means between series connected transponder transmitters in the previous or next row.

7. A system according to claim 5 wherein adjacent rows of transponder transmitters are connected to a common transmit line be individual delay means with increasing delay of at least $1/R_t$ to subsequent or adjacent transponder transmitters and with a delay increase or decrease by at least $1/R_t$ for each transponder transmitter of adjacent rows.

8. A system according to claim 5 wherein the plurality of rows of transponder transmitters are connected in parallel with adjacent rows of transponder transmitters having a time delay offset from the delay means between connected transponder transmitters in a row.

9. A system according to claim 1 wherein a plurality of transponder transmitters are separated by integral multiples of $C/R_T$ with transmitted signals time delayed by integral multiples of $1/R_T$.

10. A system according to claim 5 wherein transponders are equipped with one or more transmitters having at least one electromagnetic beam directed by an angle toward the room floor, illuminating an area at the height of the receiver antennas without illumination of transponder receivers.

11. A system according to any of claims 1 to 9 or 10 wherein the time delay means are at least one of $S_1/2R_T$, $S_2/2R_T$ through $S_n/2R_T$ and are dependent on the PN sequence being transmitted from the transponders, therefore, providing a single channel with code length $S_1$.

12. A system according to any one of claims 1 to 9 or 10 wherein the time delay means are at least one of $S_1/2R_t$, $S_2/2R_t$, through $S_n/2R_t$ and are dependent on the PN sequences being transmitted from the transponders, therefore, providing separate and independent communications channels of code lengths $S_2$ through $S_n$.

13. A lightwave spread spectrum system for wireless communication with at least one workstation, factory equipment, data processing or data controlled devices, located within an area, said system having a plurality of transponders, each transponder comprising:
   (a) modulating means for generating at least one of the more PN sequences of code length $S_1$, $S_2$, or code length $S_n$ with chip rate $R_T$, each sequence being representative of a different digital value, and responsive to a digital data signal applied thereto for providing an output signal of PN sequences representative of the data bits:
   (b) transmitter means responsive to the modulating means output signal representative thereof;
   (c) receiving means for receiving a PN modulated signal representative of received digital data, and for providing an output signal representative of the received digital data;
   (d) interface means connected to a network and responsive to signals on the network for applying a digital data signal to be transmitted to the modulating means, and responsive to the receiving means output signal for sending the received digital data over the network; and
   a plurality of transponders being located within said area with a minimum separation between transponders equal to $C/R_T$ where C is the speed of light;
   a network connected to each of the transponders;
   a communications channel for providing the digital data signal to each transponder; and
   means for providing time delays to the received signal of each transponder where the delay in the data signals received by transponders is effectively delayed by a time equal to at least $1/R_T$ from each neighboring transponder.

14. A system according to claim 13 wherein the transponders are arranged in at least one row; and
   wherein the transponder receivers in a row are connected in series with a delay means between each of the series connected transponder receivers in a row.

15. A system according to claim 14 wherein the separation between each transponder in a row is approximately equal; and
   wherein the delay of the delay means between each of the series connected transponder receivers in a row is the same.

16. The system according to claim 14 wherein the separation between each transponder in a row is equal; and wherein the delay of the delay means are connected to a common receive line are increasing in time by at least $1/R_t$ with each connected and subsequent transponder receiver.

17. A system according to claim 14 wherein the transponder receivers are arranged in a matrix composed of a plurality of rows and columns, the separation between adjacent transponder receivers along the rows and columns being approximately equal.

18. A system according to claim 17 wherein rows of transponder receivers are connected in series by a delay means having a time delay different from the delay means between series connected transponder receivers in the previous or next row.

19. A system according to claim 17 wherein adjacent rows of transponder receivers are connected to a common receive line by individual delay means with increasing delay of at least $1/R_t$ to subsequent or adjacent transponder receivers and with a delay increase or decrease by at least $1/R_t$ for each transponder receiver of adjacent rows.

20. A system according to claim 17 wherein the plurality of rows of transponder receivers are connected in parallel with adjacent rows of transponder receivers having a time delay offset from the delay means value between connected transponder receivers in a row.

21. A system according to claim 13 wherein a plurality of transponder receivers are separated by integral multiples of $C/R_T$ with received signals time delayed by integral multiples of $1/R_T$.

22. A system according to claim 17 wherein transponders are equipped with at least one receivers having at least one receive antenna pattern directed by an angle toward the room floor covering an area at the height of the workstation transmitter antennas without exposure to the transponder transmitter emissions.

23. A system according to any one of claims 13 to 21 or 22 wherein the time delay means are at least one of $S_1/2R_T$, $S_2/2R_T$ through $S_n/2R_T$ and are dependent on the PN sequence chosen for reception by the transponders of a specific communication channel represented by a code of length $S_1$, $S_2$ or $S_n$ from the transmitting workstations or other data devices.

24. A system according to claim 17 wherein the receivers and transmitters operate at different frequencies.

25. The system according to claim 1 wherein at least one workstation, factory equipment, data processing or data controlled devices are connected to at least one modem, each modem comprising:
   (a) modulating means for generating at least one PN sequence wherein the code lengths are at least one of $d_1/2R_T$, $d_2/2R_T$ through $d_n/2R_n$; where d is the selected signal delay between transponders.
   (b) transmitting means responsive to the modulating means output signal representative thereof;
   (c) receiving means for receiving a PN modulated signal representative of received digital data, and for providing an output signal representative of the received digital data.

26. The system according to claim 1 wherein at least one workstation, factory equipment, data processing or data controlled devices are connected to at least one modem, each modem comprising:
   (a) demodulating means for receiving PN sequences of code length $S_1$, $S_2$ or code length $S_n$ representative of a different digital value, and responsive to a digital data signal thereto for providing an output signal of PN sequences representative of the data bits:
   (b) transmitting means responsive to the modulating means output signal representative thereof:
   (c) receiving means for receiving a PN modulated signal representative of received digital data, and for providing an output signal representative of the received digital data.

27. A system according to claim 25 wherein modems are equipped with at least one transmitting means having at least one antenna pattern directed by an angle towards at least one transponder from antenna locations of optimum signal transmission.

28. A system according to claim 26 wherein modems are equipped with at least one receiving means having at least one antenna pattern directed by an angle toward at least one transponder from antenna locations of optimum signal reception.

29. A system according to claim 25 wherein the transmitting means operate at different wavelengths from the receiving means.

* * * * *